United States Patent
Suzuki

[19]
[11] Patent Number: 5,917,663
[45] Date of Patent: Jun. 29, 1999

[54] WIDE-ANGLE LENS WITH AN IMAGE STABILIZING FUNCTION

[75] Inventor: Kenzaburo Suzuki, Yokohama, Japan

[73] Assignee: Nikon Corporation, Tokyo, Japan

[21] Appl. No.: 09/009,116

[22] Filed: Jan. 20, 1998

Related U.S. Application Data

[63] Continuation-in-part of application No. 08/590,152, Jan. 23, 1996.

[30] Foreign Application Priority Data

Feb. 10, 1995 [JP] Japan .................................. 7-046337

[51] Int. Cl.⁶ ............................ G02B 13/04; G02B 27/64
[52] U.S. Cl. ........................ 359/749; 359/554; 359/557; 359/750; 359/752
[58] Field of Search .................................. 359/749–753, 359/554, 557

[56] References Cited

U.S. PATENT DOCUMENTS

| | | | |
|---|---|---|---|
| 4,662,723 | 5/1987 | Imai | 359/691 |
| 4,907,868 | 3/1990 | Kitagishi et al. | 359/557 |
| 4,978,205 | 12/1990 | Sato | 359/557 |
| 5,069,537 | 12/1991 | Kitagishi | 359/557 |
| 5,270,857 | 12/1993 | Oizumi et al. | 359/557 |
| 5,387,999 | 2/1995 | Hayashi | 359/557 |
| 5,557,473 | 9/1996 | Sugiyama et al. | 359/757 |
| 5,731,897 | 3/1998 | Suzuki | 359/557 |
| 5,774,267 | 6/1998 | Kodama et al. | 359/557 |

FOREIGN PATENT DOCUMENTS

| | | |
|---|---|---|
| 3403439 | 8/1984 | Germany . |
| A-1-191112 | 8/1989 | Japan . |

*Primary Examiner*—Scott J. Sugarman
*Attorney, Agent, or Firm*—Oliff & Berridge, PLC

[57] ABSTRACT

A wide-angle lens with an image stabilizing function comprises, from a front, object side to a rear, image side, a lens group GF with negative refractive power; a lens group GL with positive refractive power, wherein the back focal length is longer than the focal length of the entire optical system and overall refractive power is positive and wherein a partial lens group GLP having positive refractive power out of the lens group GL comprises at least a positive meniscus lens with the convex surface facing the image side and a biconvex lens; and a displacement device provided to reduce vibration by causing rotative motion of the partial lens group GLP about a point on the optical axis on the object side which is separated by a predetermined distance from a surface of the partial lens group GLP closest to the image side, wherein the focal length fLP of the partial lens group GLP and the focal length f of the whole lens system at infinite objective distance satisfy $0.3 < fLP/f < 5.0$. Accordingly, the present invention is capable of providing a compact, high performance wide-angle lens well suited for photographic and video uses.

21 Claims, 6 Drawing Sheets

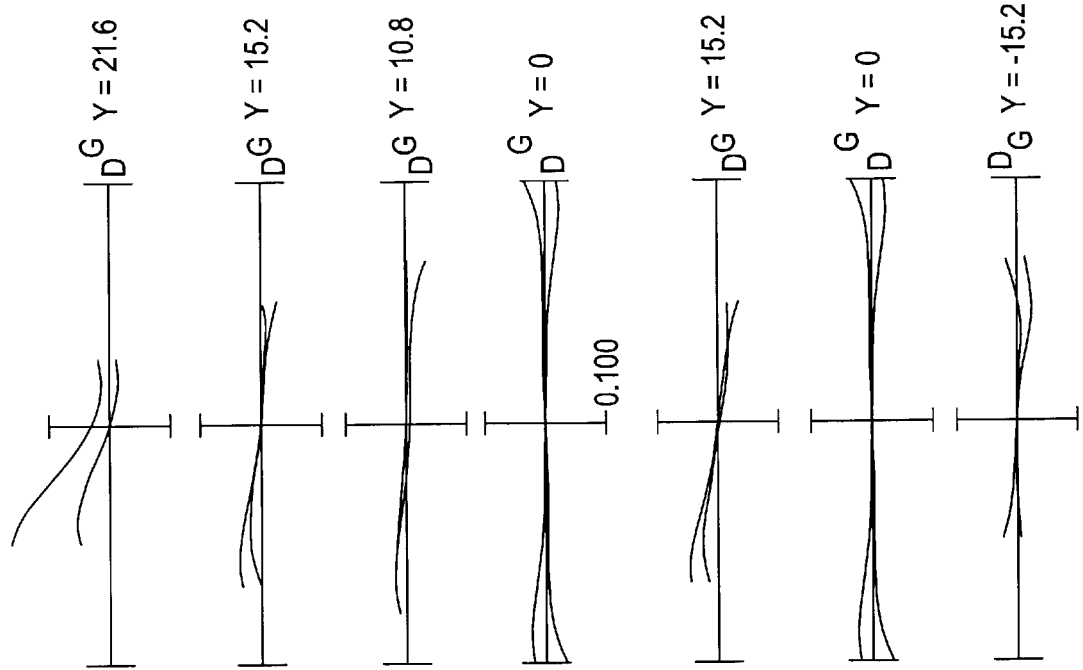
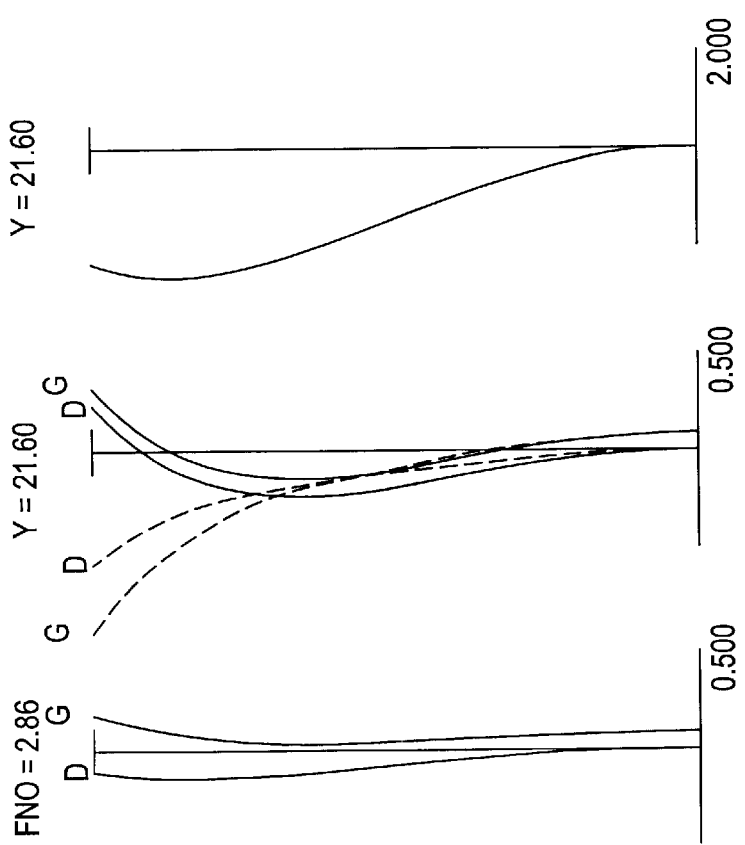
Fig. 2(a)
Fig. 2(b)

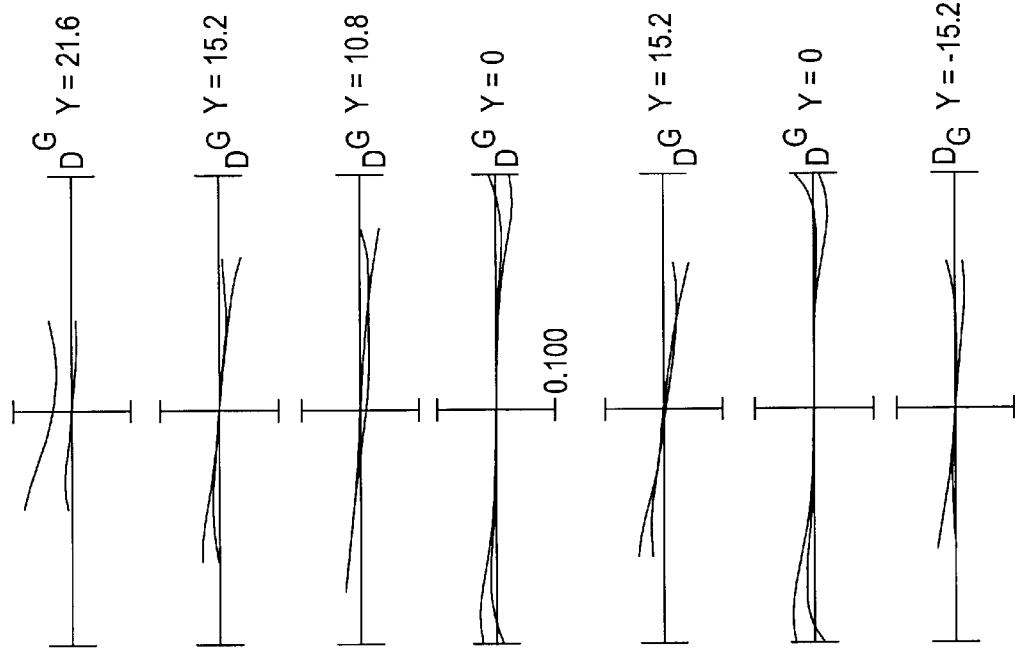
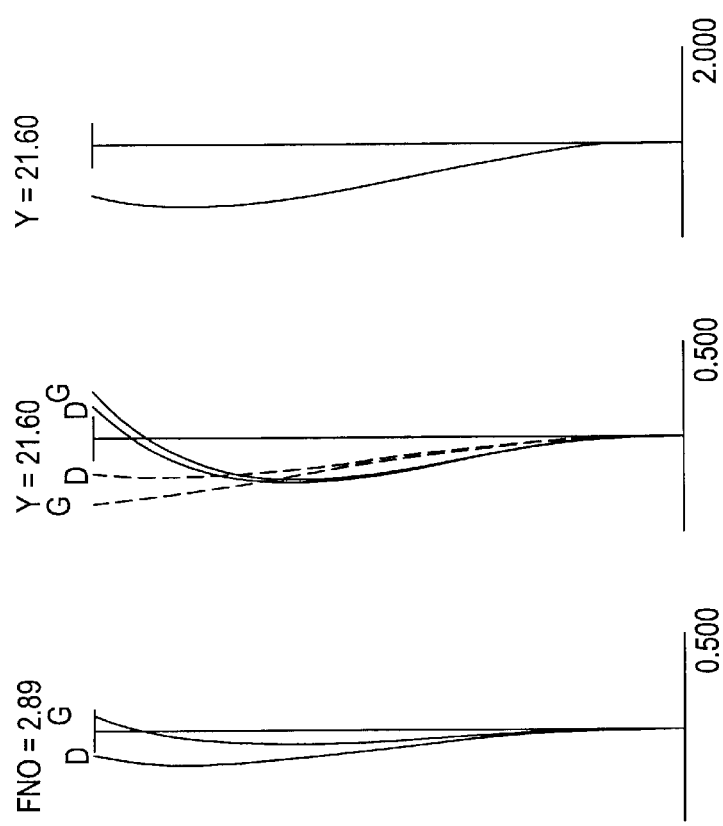
Fig. 4(a)
Fig. 4(b)

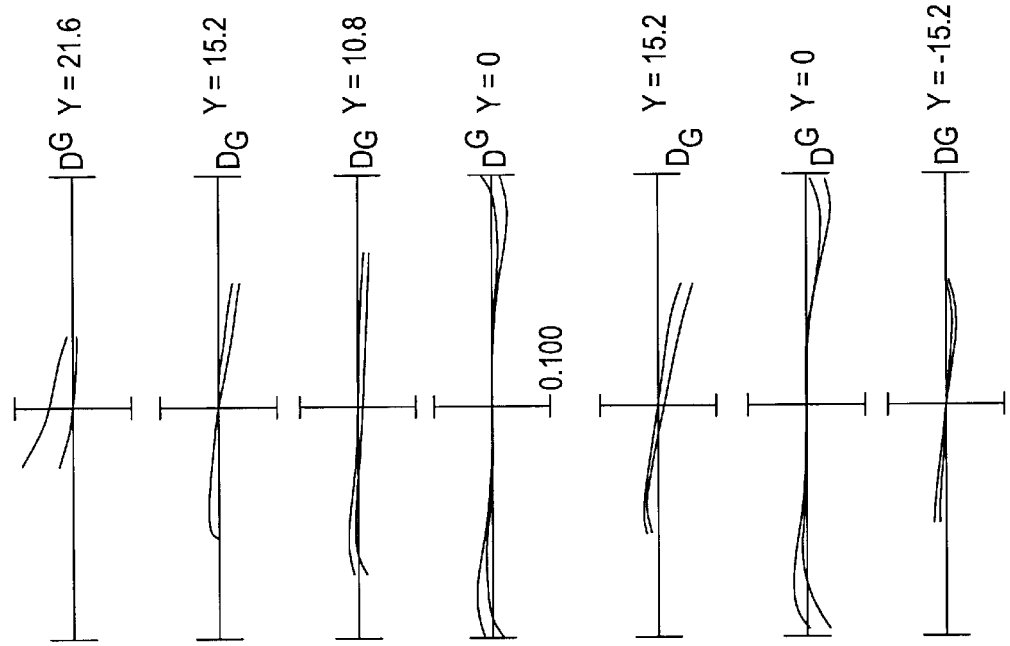
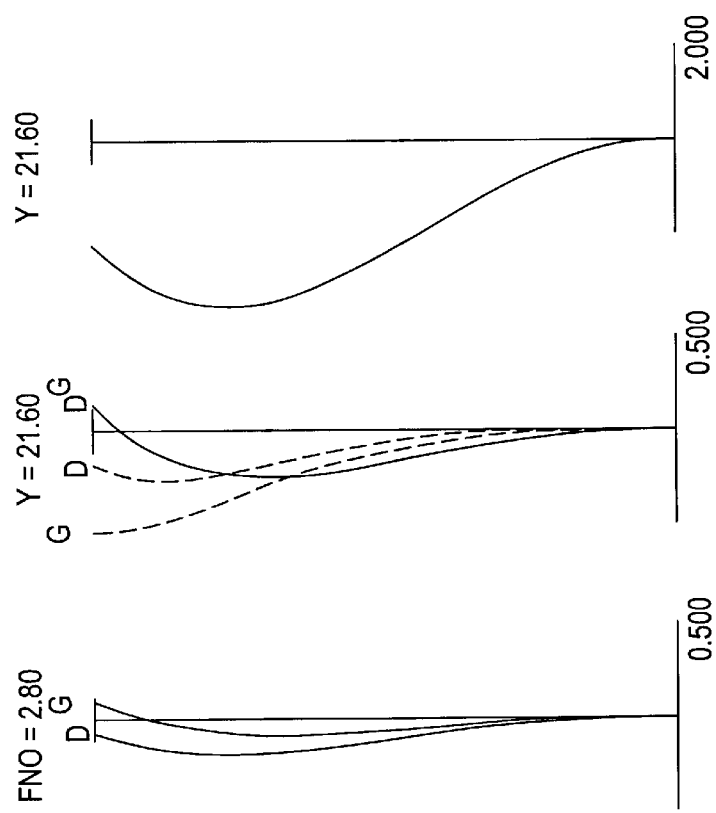
Fig. 6(a)
Fig. 6(b)

WIDE-ANGLE LENS WITH AN IMAGE STABILIZING FUNCTION

RELATED APPLICATION

This is a Continuation-in-Part application of application Ser. No. 08/590,152, filed on Jan. 23, 1996.

BACKGROUND OF THE INVENTION

Incorporation by Reference

The disclosure of the following priority application is herein incorporated by reference: Japanese Patent Application No. 7-046337, filed Feb. 10, 1995.

1. Field of the Invention

The present invention relates to a wide-angle lens with an image stabilizing function and in particular an image stabilizing method for a wide-angle lens and a super wide-angle lens for use in photographic and video devices.

2. Background of Related Art

Image stabilizing technology for a lens with a relatively short back focal length is known in the past as disclosed in Japanese Laid-Open Patent Publication Hei 1-191112 and Japanese Laid-Open Patent Publication Hei 2-103014.

In this specification, a process of correcting fluctuation of an image position caused by shaking hands and the like through movement of a lens group in a direction substantially perpendicular to the optical axis is referred to as "image stabilizing."

However, image stabilizing technology for obtaining favorable image quality for a wide-angle lens and a super wide-angle lens having a sufficiently long back focal length, such as a lens for a single lens reflex camera, has not yet been proposed.

Considering the problem described above, the present invention aims to provide a compact and highly functional wide-angle lens with an image stabilizing function well suited for use in photographic and video devices.

SUMMARY OF THE INVENTION

To overcome the above-stated problems, the present invention provides a wide-angle lens with an image stabilizing function of the type comprising, from a front, object side to a rear, image side, a lens group GF with negative refractive power; a lens group GL with positive refractive power, wherein the back focal length is longer than the focal length of the entire optical system and the overall refractive power is positive and wherein a partial lens group GLP with positive refractive power from the lens group GL comprises at least a positive meniscus lens with a convex surface facing the image side and a biconvex lens; and a displacement means for reducing vibration by causing rotative motion of the partial lens group GLP about a point on the optical axis on the object side which is separated by a predetermined distance from a surface of the partial lens group GLP closest to the image side, wherein the focal length fLP of the partial lens group GLP and the focal length f of the entire lens system at infinite objective distance satisfy, $0.3 < fLP/f < 5.0$.

In a preferred embodiment of the present invention, the lens group GF comprises a negative meniscus lens with the convex surface facing the object side, the partial lens group GLP is placed closest to the image side in the lens group GL, and a magnitude of a maximum angle of rotation $\Delta WL$ (radian) of the partial lens group GLP during reduction of vibration satisfies $\Delta WL < 0.1$.

The present invention adopts a structure of a wide-angle lens comprising, from a front, object side to a rear, image side, a lens group GF having negative refractive power and a lens group GL having positive refractive power, wherein the back focal length is longer than the focal length of the entire lens system and the overall refractive power is positive. An advantage of this type of wide-angle lens and super wide-angle lens will be described briefly to clarify a reason for adopting this structure in the present invention.

A lens tends to produce more aberration with an increase in field angle thereby deteriorating image quality. However, the wide-angle lens described above is able to obtain favorable image quality.

Moreover, such a wide-angle lens is capable of securing a large back focal length compared to the focal length of the entire lens system because it comprises the lens group GF with negative refractive power on the object side and the lens group GL with positive refractive power on the image side. Thus, the type of lens described above is well suited for use in a single lens reflex camera which is structured such that the back focal length is normally longer than the focal length of the entire lens system. Accordingly, this type of lens is referred to as a retrofocus lens.

In addition, the overall Petzval sum can be balanced favorably as a result of operation of the above-mentioned negative lens group GF.

The present invention found the optimum state of image stabilizing in the wide-angle lens described above.

With the above-described type of lens, the lens group GF on the object side tends to be large. Making the lens group GF an image stabilizing lens group which changes position across the optical axis to reduce vibration is undesirable because this makes the maintenance mechanism and driving mechanism large and complicated.

Therefore, the present invention makes a partial lens group GLP with positive refractive power from the lens group GL with positive refractive power on the image side the image stabilizing group providing a displacement means in the partial lens group GLP to reduce vibration.

Moreover, if the partial lens group GLP is the image stabilizing lens group and is composed of a single lens, large aberration occurs, which is undesirable. To obtain favorable image quality for the entire optical system, the partial lens group GLP needs to be composed of several lenses. In the present invention, it was found that the partial lens group GLP may be composed at least of a positive meniscus lens with the convex surface facing the image and a biconvex lens with the strong refractive power facing the object.

In the present invention, it was also found that shifting the image stabilizing lens group in a direction perpendicular to the optical axis is not enough to obtain favorable image quality during vibration reduction and that the image stabilizing lens group may be rotated about a point on the optical axis which is closer to the object side from the image stabilizing lens group.

Moreover, by providing a fixed flare stop on the optical axis separate from the aperture stop, undesirable light rays can be shielded when the image stabilizing lens group GLP changes position across the optical axis to reduce vibration, thus avoiding stray light and unnecessary exposure.

Further, to achieve favorable image quality, a negative meniscus lens with the convex surface facing the object may be provided in the lens group GF.

BRIEF DESCRIPTION OF THE DRAWINGS

FIGS. 2(a) and 2(b) show various aberrations for the infinite objective distance in the first embodiment;

FIGS. 4(a) and 4(b) show various aberrations for the infinite objective distance in the second embodiment;

FIGS. 6(a) and 6(b) show various aberrations for the infinite objective distance in the third embodiment.

DESCRIPTION OF THE PREFERRED EMBODIMENTS

Figure 1:
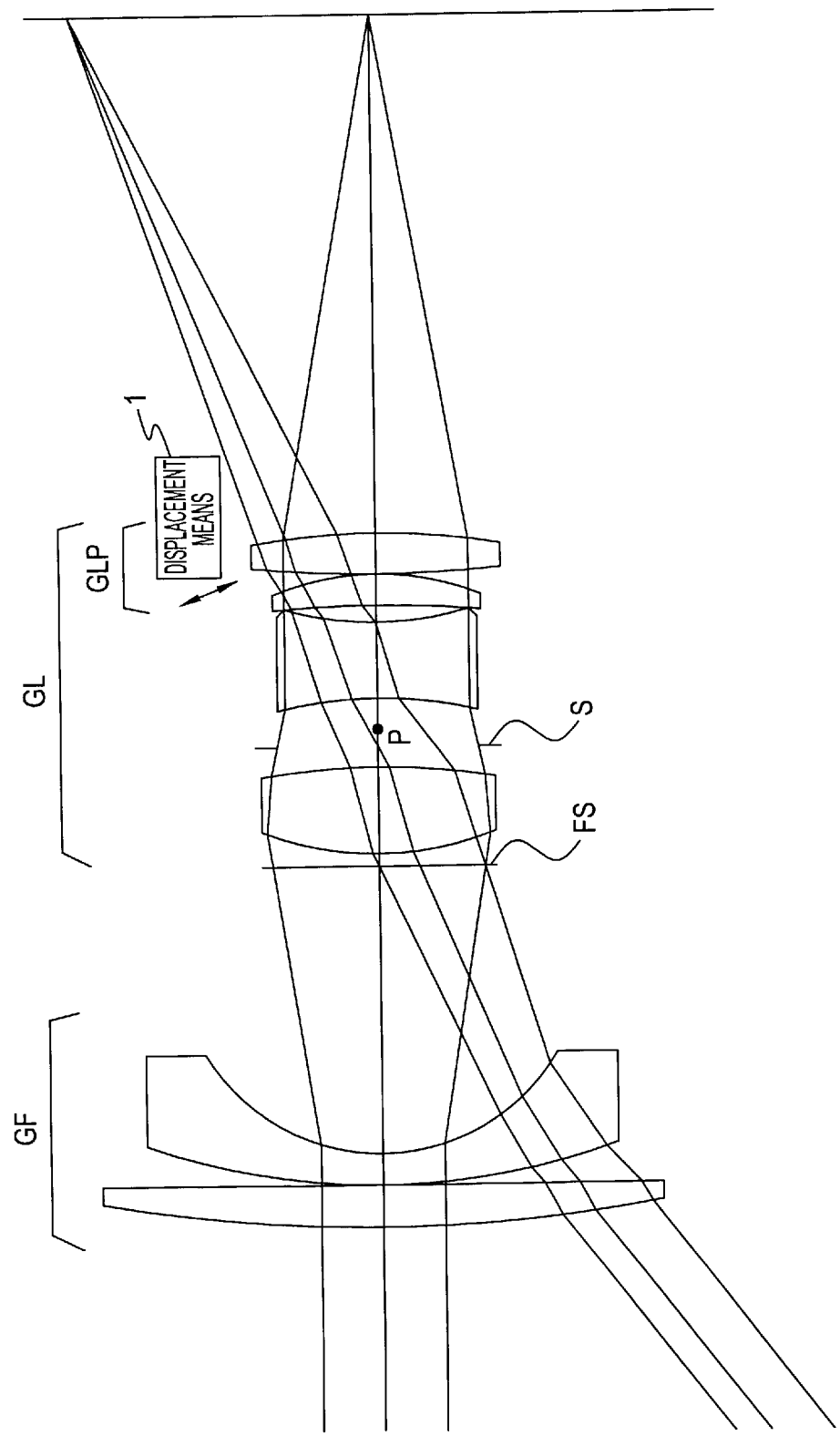
FIG. 1 shows the structure of a wide-angle lens according to a first embodiment of the present invention.

Each conditional equation of the present invention will hereinafter be described and then the present invention will be described in connection with preferred embodiments thereof. It will be understood that the preferred embodiments described are not intended to limit the invention to those embodiments. On the contrary, the invention is intended to cover all alternatives, modifications and equivalents that may be included within the spirit and scope of the invention as defined by the appended claims. Also, for a general understanding of the features of the present invention, reference is made to the drawings. In the drawings, like reference numerals have been used throughout to designate identical elements.

Figure 3:
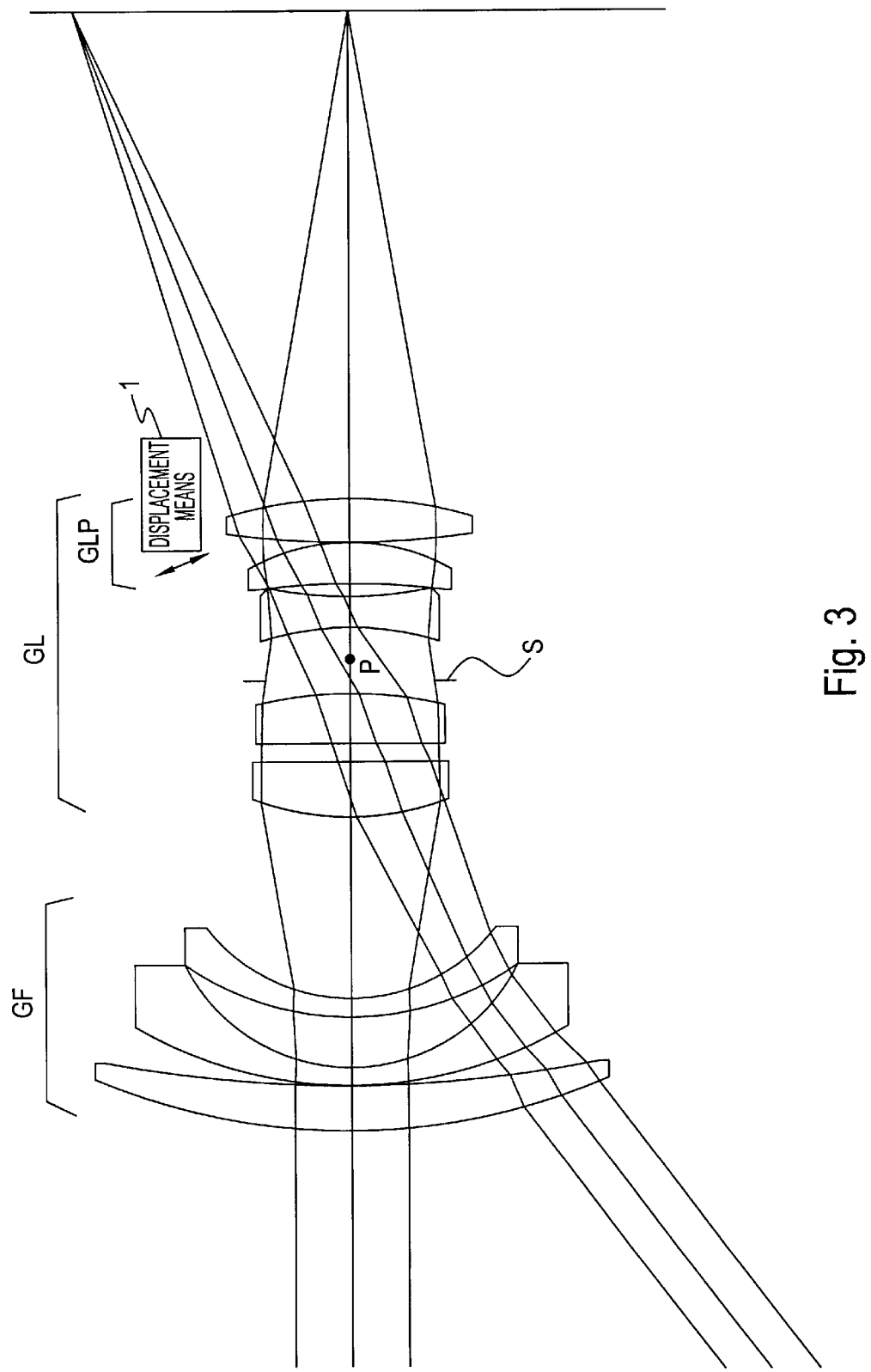
FIG. 3 shows the structure of a wide-angle lens according to a second embodiment of the present invention.
Figure 5:
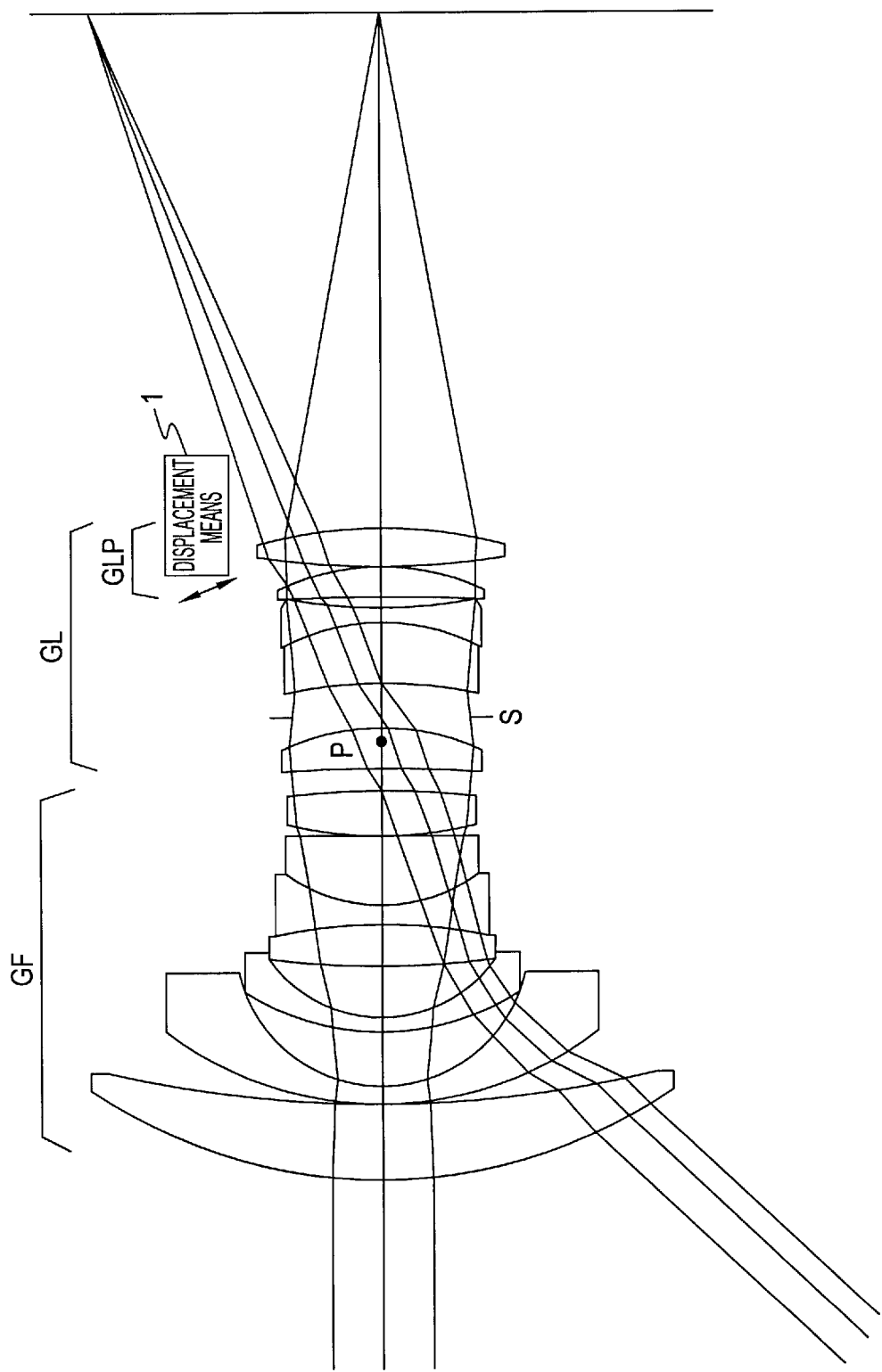
FIG. 5 shows the structure of a wide-angle lens according to a third embodiment of the present invention.

Further, FIGS. 1, 3 and 5 each show an embodiment of the wide-angle lens of the invention. In each Figure the lens includes a first lens group GF, a second lens group GL, a partial lens group GLP and displacement means 1.

The wide-angle lens of the present invention satisfies the conditional equation (1) below.

$$0.3 < fLP/f < 5.0 \tag{1}$$

where, fLP: the focal length of a partial lens group GLP, and f: the focal length of the entire lens system at infinite objective distance.

The conditional equation (1) defines an appropriate range for the ratio between the focal length fLP of the image stabilizing lens group GLP and the focal length f of the entire lens system.

If the upper limit of the conditional equation (1) is exceeded, the focal length fLP of the image stabilizing lens group GLP becomes too large, causing a tendency for the length of the total lens system to be long. This is undesirable since one of the purposes of the present invention is to make the system compact. This also causes a tendency to produce excessively large spherical aberration in a positive direction, which is undesirable.

On the other hand, if the lower limit of the conditional equation (1) is not reached, the focal length fLP becomes too small, creating a tendency for spherical aberration to become too large in a negative direction. Moreover, the Petzval sum tends to change substantially in a positive direction, causing frequent occurrence of bow in the image plane in a negative direction to occur, which is undesirable.

To obtain better image quality, the upper limit and the lower limit in the conditional equation (1) may preferably be changed to 2.0 and 0.5, respectively.

Moreover, in the present invention, a negative meniscus lens with the convex surface facing the object side may preferably be provided in the lens group GF and the partial lens group GLP may preferably be placed closest to the image side in the lens group GL, satisfying the conditional equation (2) below.

$$\Delta WL < 0.1 \text{ (radian)} \tag{2}$$

where,

ΔWL: the magnitude of the maximum angle of rotation of the partial lens group GLP during vibration reduction.

The conditional equation (2) defines an appropriate range for the maximum angle of rotation of the image stabilizing lens group GLP.

If the upper limit of the conditional equation (2) is exceeded, the maximum rotation amount of the image stabilizing lens group GLP during vibration reduction becomes too large. As a result the amount of fluctuation becomes large during image stabilizing, which is undesirable. In particular, the difference in the direction of optical axis between the best image plane in meridional direction and the best plane in sagittal direction expand in the vicinity of the center of the image plane, which is undesirable.

To obtain better image quality, the upper limit in the conditional equation (2) may preferably be changed to 0.03 (radian).

Moreover, to achieve even better image quality and image stabilizing quality the conditional equation (3) and (4) below may preferably be satisfied.

$$0.2 < f1/fF < 4.0 \tag{3}$$

$$L/f < 0.7 \tag{4}$$

where, f1: the focal length of the negative meniscus lens closest to the object side with the convex surface facing the object side in the lens group GF fF: the focal length of lens group GF L: longitudinal thickness of the image stabilizing lens group GLP The conditional equation (3) defines an appropriate range for the ratio between the focal length of the lens group GF and the focal length of the negative meniscus lens closest to the object side with the convex surface facing the object side in the lens group GF.

If the upper limit of the conditional equation (3) is exceeded, the back focal length tends to be short, which is undesirable. Moreover, bow in the image plane in a negative direction is easily produced, which is undesirable.

On the other hand, if the lower limit of the conditional equation (3) is not reached, spherical aberration becomes excessively large in a positive direction and distortion aberration tends to become too large in a positive direction, which is undesirable.

To obtain better image quality, the upper limit and the lower limit in the conditional equation (3) may preferably be changed to 2.0 and 0.4 respectively.

The conditional equation (4) defines an appropriate range for the ratio between the focal length of the entire lens system and the longitudinal thickness of the image stabilizing lens group GLP.

If the upper limit of the conditional equation (4) is exceeded, the longitudinal thickness of the lens group GLP becomes too large, causing the image stabilizing mechanism to become too large and complex, which is undesirable.

Here, to further simplify and miniaturize the image stabilizing mechanism, the upper limit of the conditional equation (4) may preferably be changed to 0.35.

In actually designing image stabilizing lens group GLP, the conditional equations (5)–(8) below should be satisfied.

$$1.5 < N- \tag{5}$$

$$40 < \nu u+ \tag{6}$$

$$-3.0 < (R2+R1)/(R2-R1) < 0 \qquad (7)$$

$$0 < D/fLP < 10.0 \qquad (8)$$

where,

N−: the refractive index of the negative meniscus lens in the lens group GF closest to the object side with the convex surface facing the object side;

nyu+: the Abbe number of the biconvex lens in the lens group GL closest to the image side;

R1: the radius of curvature of a surface closest to the object side of the positive meniscus lens which is closest to the object side in the image stabilizing lens group GLP;

R2: the radius of curvature of a surface closest to the image side of the positive meniscus lens which is closest to the object side in the image stabilizing lens group GLP; and D: the predetermined distance between a surface closest to the image side of the image stabilizing lens group GLP and a center of rotation along the axis.

Here, the refractive index and the Abbe number are the values with respect to d-line ($\lambda$=587.6 nm). Moreover, if the positive meniscus lens closest to the object side in the image stabilizing lens group GLP, contains a non-spherical surface, R1 and R2 are understood to represent near-axis radii of curvatures.

The conditional equation (5) defines an appropriate range for the refractive index of the negative meniscus lens closest to the object side with the convex side facing the object side in the lens group GF.

If the upper limit of the conditional equation (5) is exceeded, spherical aberration easily becomes excessively large in a positive direction at infinite objective distance as well as image stabilizing, and distortion aberration also becomes large in a positive direction, which is undesirable. Moreover, the Petzval sum tends to change to the negative side, causing a tendency for bow in the image plane to become large in the positive direction, which is undesirable.

The conditional equation (6) defines an appropriate range for the Abbe number of the biconvex lens closest to the image side in the lens group GL.

If the lower limit of the conditional equation (6) is not reached, longitudinal chromatic aberration of the short wave tends to become excessively large in a positive direction at infinite objective distance as well as in image stabilizing, which makes it difficult to obtain favorable image quality.

The conditional equation (7) defines an appropriate range for shape factor of the positive meniscus lens closest to the object side in the image stabilizing lens group GLP.

If the upper limit of the conditional equation (7) is exceeded, the bow of the image plane becomes excessively large in a positive direction, which is undesirable. Moreover, correction of coma aberration becomes difficult.

On the other hand, if the lower limit of the conditional equation (7) is not reached, the bow of the image plane becomes excessively large in a negative direction, which is undesirable. Moreover, correction of coma aberration becomes difficult.

As described before, the center of rotation during vibration reduction may preferably be a point located on the optical axis on the object side of the image stabilizing lens group GLP a predetermined distance from a surface of the image stabilizing lens group GLP closest to the image side. Here, the conditional equation (8) defines the position of the center of rotation during vibration reduction to obtain even better image stabilizing.

If the range defined by the conditional equation (8) is not satisfied, the fluctuation of coma aberration during vibration reduction becomes large, which is undesirable. In particular, the difference in the direction of optical axis between the best image plane in meridional direction and the best plane in sagittal direction expand in the vicinity of the center of the image plane, which is undesirable.

If the image stabilizing lens group GLP is to be composed of two lenses, it may be preferable to have a positive meniscus lens with the convex surface facing the image side and a biconvex lens having the surface with strong refractive power facing the object side.

Moreover, to simplify the maintenance mechanism and the driving mechanism, the image stabilizing lens group GLP may be fixed along the optical axis when a close object is focused.

Furthermore, by placing a positive meniscus lens with the convex surface facing the object side closest to the object side in the lens group GF, distortion aberration is effectively corrected.

Moreover, to achieve a favorable flat characteristics of the image plane, the Petzval sum PLP of the image stabilizing lens group GLP and the Petzval sum PA of the entire lens system may preferably satisfy the conditional equation (9) below.

$$0 < PLP/PA < 8.0 \qquad (9)$$

Moreover, to secure a back focal length sufficiently large and to obtain favorable balance of aberration correction, the conditional equations (10)–(11) below may preferably be satisfied.

$$0.3 < |fF|/fL < 3.0 \qquad (10)$$

$$0.7 < fL/f < 3.0 \qquad (11)$$

where fL: the focal length of the lens group GL.

Here, focusing of close objects can be accomplished by a method in which the entire optical system is advanced as a unit or by dividing the entire lens system into a plurality of lens groups and moving each lens group separately along the optical axis.

Moreover, the lens to be placed adjacent to the object side of the image stabilizing lens group GLP may preferably be a biconcave lens.

Furthermore, the aperture stop may preferably be positioned in or near the lens group GL. Moreover, the surface to be arranged adjacent to the image side of the aperture stop may preferably possess strong divergent characteristics.

In an embodiment of the present invention, it is preferable to place the aperture stop on the object side of the component lens group GLP functioning as the image stabilizing lens group. Moreover, it is preferable to place the center of rotation position P of the component lens group GLP on the object side instead of on the lens surface of the nearest object side of the component lens group GLP, and near the aperture stop.

It is also preferable to satisfy the below equation, in which, when the distance from the aperture stop to the center of rotation position P of the component lens group GLP (the image stabilizing lens group) is taken to be $\Delta D$, and when the distance from the aperture stop to the lens surface of the component lens group GLP (the image stabilizing lens group) closest to the object side is taken to be $\Delta d$, then:

$$|\Delta D|/\Delta d < 0.5 \qquad (12)$$

However, for the distance $\Delta D$ and the distance $\Delta d$, the direction from the object side to the image side is defined as positive.

The conditional equation (12) is the condition for carrying out image stabilization in which there is little worsening of the aberration in a lens group having an image angle as wide as in the present invention. When the data strays from the conditional equation (12), the position at the rotation center of the component lens group GLP that moves in the rotation direction to achieve image stabilization strays greatly from the aperture stop. At this time, in a lens group having the characteristics that the image angle is as wide as in the present invention, and the degree with the optical axis of the luminous flux exiting from the lens group that is outside of the axis, is large, when the component lens group at the time of image stabilization strays from the optical axis, the worsening of the aberration is great as compared to the reference state in which the component lens group is on the optical axis. Further, when image stabilization is performed, it is preferable to define $|\Delta D|/\Delta d<0.35$ in order to prevent further worsening of the aberration.

In addition, if a non-spherical surface or distributed refractive index type glass is used as one of the optical system lenses including the image stabilizing lens group GLP, superior optical quality is obtained.

As previously stated, each embodiment of a wideangle lens with the image stabilizing function in the present invention comprises, from a front, object side to rear, image side, the lens group GF with negative refractive power and the lens group GL with positive refractive power, wherein the back focal length is larger than the focal length of the entire optical system and the overall refractive power is positive and wherein the partial lens group GLP with positive refractive power in the first lens group GL comprises at least a positive meniscus lens with the convex surface facing the image side and a biconvex lens. Moreover, a displacement means 1 is provided to reduce vibration by causing rotative motion of the partial lens group GLP with the center at a point P on the optical axis on the object side which is separated by a predetermined distance from a surface of the partial lens group GLP closest to the image side.

FIG. 1 shows a structure of the wide-angle lens according to a first embodiment of the present invention. The wide-angle lens described comprises, from a front, object side to rear, image side the lens group GF having a biconvex lens and a negative meniscus lens with the convex surface facing the object side, and the lens group GL having a biconvex lens, a biconcave lens, a positive meniscus lens with the convex surface facing the image side and a biconvex lens.

Two lenses in the lens group GL which are placed on the image side, that is, the positive meniscus lens with the convex surface facing the image side and a biconvex lens compose the image stabilizing lens group GLP. Moreover, a fixed flare stop FS is provided between the lens group GF and the lens group GL, and an aperture stop S is provided in the lens group GL.

The image stabilizing lens group GLP is properly rotated about the center point P by the displacement mechanism 1 which is an image stabilizing mechanism for correcting blurring of an image caused by shaking of the hands and the like.

The embodiment 1 is an application of the present invention to a wide-angle photographic lens.

The values of various dimensions of embodiment 1 of the present invention are listed in Table (1) below. In Table (1), f denotes focal length at infinite objective distance, FNO denotes F-number at infinite objective distance, and Bf denotes back focal length. Moreover, the number in the far left indicates the order of the lens surfaces from front to rear, R denotes the radius of curvature of each lens surface, d denotes the space of each lens, n(D) and γ denote respectively refractive indices and the Abbe numbers corresponding to a d-line (λ=587.6 nm), and n(G) denotes refractive indices corresponding to a g-line (λ=435.8 nm).

TABLE 1 f = 28.597
FNO = 2.86

| | R | d | γ | n(D) | n(G) |
|---|---|---|---|---|---|
| 1 | 137.0556 | 3.0000 | 33.75 | 1.648310 | 1.673230 |
| 2 | -4002.6300 | 0.2000 | | | |
| 3 | 62.3678 | 2.000 | 58.50 | 1.651600 | 1.665390 |
| 4 | 15.2995 | 21.1000 | | | |
| 5 | ∞ | | 1.1000 (fixed flare stop FS) | | |
| 6 | 26.6224 | 6.3000 | 45.37 | 1.796680 | 1.818800 |
| 7 | -60.5608 | 1.4000 | | | |
| 8 | ∞ | | 3.6000 (aperture stop S) | | |
| 9 | -26.7885 | 5.6000 | 26.05 | 1.784700 | 1.824530 |
| 10 | 33.7247 | 1.1500 | | | |
| 11 | -77.1041 | 2.2000 | 55.60 | 1.696800 | 1.712320 |
| 12 | -22.2069 | 0.1000 | | | |
| 13 | 84.6383 | 3.0000 | 53.93 | 1.713000 | 1.729420 |
| 14 | -47.0415 | | 38.0829 (Bf) | | |

Image Stabilizing Conditions
  Infinite objective distance
  Amount of maximum angle of rotation of the image stabilizing lens group (radian)=0.00611
  Amount of image movement=+0.136; + for the sign of amount of image movement indicates that movement of image is in the same direction as rotation of the lens
Resulting Values
  f=28.597
  fF=-38.231
  fL=29.093
  fLP=21.890
  ΔWL=0.00611
  L=5.3
  f1=-31.642
  D=14.45
  ΔD=1.2 mm
  Δd=10.35 mm
  (1) fLP/f=0.765
  (2) ΔWL=0.00611
  (3) f1/fF=0.828
  (4) L/f=0.185
  (5) N-=1.65160
  (6) γ+=53.93
  (7) (R2+R1)/(R2-R1)=-1.650
  (8) D/fLP=0.660
  (9) PLP/PA=5.419
  (10) |fF|/ft=1.314
  (11) fL/f=1.017
  (12) |ΔD|/Δd=0.116

FIGS. 2(a) and 2(b) show various aberration diagrams at infinite objective distance in embodiment 1.

In each aberration diagram, FNO denotes F-number, Y denotes image height, D denotes d-line (λ=587.6 nm), and G denotes g-line (λ=435.8 nm) respectively. Moreover, in the aberration diagram describing astigmatism, the solid line represents the sagittal image plane while the broken line represents the meridional image plane.

Each aberration diagram clearly shows that various aberrations are favorably corrected including image stabilizing time in the present invention.

FIG. 3 shows the structure of a wide-angle lens according to a second embodiment of the present invention. The wide-angle lens described in the figure comprises, from front to rear, the lens group GF having a positive meniscus lens with the convex surface facing the object side, a negative meniscus lens with the convex surface facing the object side and a negative meniscus lens with the convex surface facing the object side and the lens group GL having a plano-convex lens with the convex surface facing the object side, a plano-convex lens with the convex surface facing the image side, a biconcave lens, a positive meniscus lens with the convex surface facing the image side and a biconvex lens.

Here, two lenses in the lens group GL which are placed on the image side, that is, the positive meniscus lens with the convex surface facing the image side and a biconvex lens compose the image stabilizing lens group GLP. Moreover, an aperture stop S is provided in the lens group GL.

The image stabilizing lens group GLP is properly rotated about the center point P by the displacement mechanism 1 which is an image stabilizing mechanism for correcting blurring of the image caused by shaking of the hands and the like.

The embodiment 2 is an application of the present invention to a wide-angle photographic lens with a focal length substantially the same as in embodiment 1.

The values of various dimensions of embodiment 2 of the present invention are listed in Table (2) below. In Table (2), f denotes focal length at infinite objective distance, FNO denotes F-number at the infinite objective distance, and Bf denotes back focal length. Moreover, the number in the far left indicates the order of the lens surfaces from front to rear, R denotes the radius of curvature of each lens surface, d denotes the space of each lens, n(D) and γ denote respectively refractive indices and Abbe numbers corresponding to a d-line (λ=587.6 nm), and n(G) denotes refractive indices corresponding to a g-line (λ=435.8 nm).

TABLE 2 f = 28.610
FNO = 2.89

| | R | d | γ | n(D) | n(G) |
|---|---|---|---|---|---|
| 1 | 60.5000 | 3.5000 | 47.07 | 1.670030 | 1.688060 |
| 2 | 118.3000 | 0.1000 | | | |
| 3 | 36.9000 | 1.5000 | 64.10 | 1.516800 | 1.526690 |
| 4 | 15.4000 | 4.0000 | | | |
| 5 | 28.2000 | 1.5000 | 64.10 | 1.516800 | 1.526690 |
| 6 | 15.1300 | 14.4000 | | | |
| 7 | 28.6000 | 4.4000 | 41.96 | 1.667550 | 1.687870 |
| 8 | ∞ | 1.3500 | | | |
| 9 | ∞ | 4.0000 | 60.14 | 1.620410 | 1.633140 |
| 10 | −33.9700 | 1.0000 | | | |
| 11 | ∞ | | 4.3000 (aperture stop S) | | |
| 12 | −20.8000 | 2.5500 | 27.61 | 1.755200 | 1.791120 |
| 13 | 53.1800 | 1.0000 | | | |
| 14 | −46.0010 | 3.1000 | 57.53 | 1.670250 | 1.684660 |
| 15 | −17.9000 | 0.1000 | | | |
| 16 | 109.0970 | 3.5000 | 57.53 | 1.670250 | 1.684660 |
| 17 | −34.8000 | | 38.9793 (Bf) | | |

Image Stabilizing Conditions

Infinite objective distance

Amount of maximum angle of rotation of the objective distance lens group (radian)=0.00611

Amount of image movement=+0.128; + for the sign of amount of image movement indicates that movement of image is in the same direction as rotation of the lens Resulting Values
 f=28.610
 fF=−34.854
 fL=28.134
 fLP=20.535
 ΔWL=0.00611
 L=6.7
 f1=−52.388
 D=12.7
 ΔD=1.85 mm
 Δd=7.85 mm
 (1) fLP/f=0.718
 (2) ΔWL=0.00611
 (3) f1/fF=1.503
 (4) L/f=0.234
 (5) N−=1.51680
 (6) γ+=57.53
 (7) (r2+r1)/(r2−r1)=−2.433
 (8) D/fLP=0.618
 (9) PLP/PA=5.443
 (10) |fF|/ft=1.239
 (11) fL/f=0.983
 (12) |ΔD|/Δd=0.236

FIGS. 4(a) and 4(b) show various aberration diagrams at infinite objective distance in embodiment 2.

In each aberration diagram, FNO denotes F-number, Y denotes image height, D denotes d-line (λ=587.6 nm), and G denotes g-line (λ=435.8 nm) respectively. Moreover, in the aberration diagram describing astigmatism, the solid line represents the sagittal image plane while the broken line represents the meridional image plane.

Each aberration diagram clearly shows that various aberrations are favorably corrected including image stabilizing time in the present invention.

FIG. 5 shows the structure of a wide-angle lens according to a third embodiment of the present invention. The wide-angle lens described in the figure comprises, from front to rear, the lens group GF having a positive meniscus lens with the convex surface facing the object side, a negative meniscus lens with the convex surface facing the object side, a negative meniscus lens with the convex surface facing the object side, a cemented lens composed of a biconvex lens and a pair of plano-convex lenses with one convex surface facing the object side and another convex surface facing the image side, and a biconvex lens, and the lens group GL having a positive meniscus lens with the concave surface facing the object side, a cemented lens composed of a positive meniscus lens with the convex surface facing the image side and a biconcave lens, a positive meniscus lens with the convex surface facing the image side and a biconvex lens.

Here, two lenses in the lens group GL which are placed on the image side, that is, the positive meniscus lens with the convex surface facing the image side and a biconvex lens compose the image stabilizing lens group GLP. Moreover, an aperture stop S is provided in the lens group GL.

The image stabilizing lens group GLP is properly rotated about the center point P by the displacement mechanism 1 which is an image stabilizing mechanism for correcting blurring of the image caused by shaking of the hands and the like.

The embodiment 3 is an application of the present invention to a wide-angle photographic lens with a focal length smaller than the ones in embodiments 1 and 2.

The values of various dimensions of embodiment 3 of the present invention are listed in Table (3) below. In Table (3), f denotes focal length at infinite objective distance, FNO denotes F-number at infinite objective distance, and Bf denotes back focal length. Moreover, the number in the far left indicates the order of the lens surfaces from the object, R denotes the radius of curvature of each lens surface, d denotes space of each lens, n(D) and γ denote respectively refractive indices and the Abbe numbers corresponding to a d-line (λ=587.6 nm), and n(G) denotes refractive indices corresponding to a g-line (λ=435.8 nm).

TABLE 3 f = 20.378
FNO = 2.80

|    | R        | d      | γ      | n(D)         | n(G)     |
|----|----------|--------|--------|--------------|----------|
| 1  | 39.6230  | 5.6000 | 60.35  | 1.620410     | 1.633100 |
| 2  | 101.1760 | 0.1000 |        |              |          |
| 3  | 27.6070  | 1.4000 | 26.05  | 1.784700     | 1.824510 |
| 4  | 11.0354  | 4.0000 |        |              |          |
| 5  | 19.4100  | 1.2000 | 53.93  | 1.713000     | 1.729410 |
| 6  | 10.3299  | 3.8000 |        |              |          |
| 7  | 76.4200  | 3.2000 | 27.61  | 1.755200     | 1.791120 |
| 8  | −30.0600 | 1.3000 | 49.45  | 1.772790     | 1.792320 |
| 9  | 11.9598  | 5.0000 | 35.70  | 1.625880     | 1.648550 |
| 10 | ∞        | 1.0000 |        |              |          |
| 11 | 32.9450  | 3.3000 | 32.17  | 1.672700     | 1.699910 |
| 12 | −94.2301 | 1.6000 |        |              |          |
| 13 | −90.0270 | 3.2000 | 46.42  | 1.582670     | 1.598570 |
| 14 | −16.3258 | 0.6000 |        |              |          |
| 15 | ∞        |        | 2.700 (aperture stop S) | | |
| 16 | −22.8970 | 4.5000 | 49.45  | 1.772790     | 1.792320 |
| 17 | −14.1510 | 1.1000 | 26.05  | 1.784700     | 1.824510 |
| 18 | 53.8439  | 0.8220 |        |              |          |
| 19 | −79.4290 | 2.2000 | 60.35  | 1.620410     | 1.633100 |
| 20 | −17.3650 | 0.1000 |        |              |          |
| 21 | 96.2190  | 2.8000 | 60.35  | 1.620410     | 1.633100 |
| 22 | −31.2401 |        | 37.9654 (Bf) | |       |

Image Stabilizing Conditions

Infinite objective distance

Amount of maximum angle of rotation of the image stabilizing lens group (radian)=0.00873

Amount of image movement=+0.254; + for the sign of amount of image movement indicates that movement of image is in the same direction as rotation of the lens Resulting Values f=20.378 fF=−45.049 fL=27.453 fLP=18.652

ΔWL=0.00873

L=5.1 f1=−24.332

D=15.922

ΔD=−1.7 mm

Δd=9.112 mm (1) fLP/f=0.915

(2) ΔWL=0.00873

(3) f1/fF=0.540

(4) L/f=0.250

(5) N−=1.78470

(6) γ+=60.35

(7) (R2+R1)/(R2−R1)=−2.332

(8) D/fLP=0.854

(9) PLP/PA=6.410

(10) |fF|/ft=1.641

(11) fL/f=0.347

(12) |ΔD|/Δd=0.186

FIGS. 6(a) and 6(b) show various aberration diagrams at infinite objective distance in embodiment 3.

In each aberration diagram, FNO denotes F-number, Y denotes image height, D denotes d-line (λ=587.6 nm), and G denotes g-line (λ=435.8 nm) respectively. Moreover, in the aberration diagram describing astigmatism, the solid line represents the sagittal image plane while the broken line represents the meridional image plane.

Each aberration diagram clearly shows that various aberrations are favorably corrected including image stabilizing time in the present invention.

As described above, the present invention is capable of providing a compact and high performance retrofocus wide-angle lens and a retrofocus super wide-angle lens with an image stabilizing function which is well suited for photographic and video uses.

Hence, the present invention is extremely convenient during actual shooting since it enables slow shutter photography and slow synchronizing shooting as well as hand held shooting. Moreover, optimum exposure corresponding to shooting condition becomes possible. In addition, by fixing the image stabilizing lens group after shifting, the so-called swing effect, in which perspective is changed, is achieved.

While the invention has been described in conjunction with preferred embodiments thereof, it is evident that many alternatives, modifications and variations may be apparent to those skilled in the art. Accordingly, it is intended to embrace all alternatives, modifications and variations which may fall within the spirit and broad scope of the appended claims.

What is claimed is:

1. A wide-angle lens with an image stabilizing function, comprising, from a front, object side to a rear, image side of the lens:

a first lens group with negative refractive power;

a second lens group with positive refractive power, wherein a back focal length is longer than a focal length of the entire lens, the second lens group comprising:

an aperture stop;

a partial lens group having positive refractive power and comprising a positive meniscus lens with the convex surface facing the image side and a biconvex lens, and a lens surface of the partial lens group closest to the object side being spaced from the aperture stop by a distance Δd; and a displacement mechanism for reducing vibration by causing rotational motion of the partial lens group about a point on the optical axis on the object side of the partial lens group, the point being spaced from a surface of the partial lens group on the image side by a predetermined distance, wherein the focal length fLP of the partial lens group and the focal length f of the entire lens at infinite objective distance satisfy 0.3<fLP/f<5.0, and the point being spaced from the aperture stop by a distance ΔD such that |ΔD|/Δd<0.5.

2. The lens of claim 1, wherein the focal length fLP of the partial lens group and the focal length f of the entire lens at infinite objective distance further satisfy 0.5<fLP/f<2.0.

3. The lens of claim 1, wherein the first lens group comprises a negative meniscus lens with the convex surface facing the object side, the partial lens group is placed closest to the image side in the second lens group and a magnitude of a maximum angle of rotation ΔWL in radian of the partial lens group during reduction of vibration satisfies ΔWL<0.1.

4. The lens of claim 1, wherein a focal length f1 of a negative meniscus lens in the first lens group closest to the object side with the convex surface facing the object side, the focal length fF of the first lens group, the focal length of the entire lens f at the infinite objective distance, and longitudinal thickness L of the partial lens group satisfy 0.2<f1/fF<4.0 and L/f<0.7.

5. The lens of claim 1, wherein a focal length f1 of a negative meniscus lens in the first lens group closest to the object side with the convex surface facing the object side, the focal length fF of the first lens group, the focal length of the entire lens f at the infinite objective distance, and longitudinal thickness L of the partial lens group satisfy 0.4<f1/fF<2.0 and L/f<0.35.

6. The lens of claim 1, wherein a refractive index N of a negative meniscus lens in the first lens group closest to the object side with the convex surface facing the object side, and the Abbe number nyu+ of the biconvex lens in the second lens group closest to the image side satisfy 1.5<N− and 40<nyu+ respectively.

7. The lens of claim 1, wherein a radius of curvature R1 of a surface closest to the object side of the positive meniscus lens which is closest to the object side in the partial lens group, a radius of curvature R2 of a surface closest to the image side of the positive meniscus lens which is closest to the object side in the partial lens group, a predetermined distance D between a surface closest to the image side in the partial lens group and the point along the axis, and the focal length fLP of the partial lens group satisfy −3.0<(R2+R1)/(R2−R1)<0 and 0<D/fLP<10.0.

8. The lens of claim 1, further comprising a fixed flare stop provided on the optical axis to shield undesirable light rays when the partial lens group rotates around the point to reduce vibration.

9. An image stabilizing method for a wide-angle lens, comprising:
  placing in order from a front, object side to a rear, image side of the lens a first lens group with negative refractive power and a second lens group with positive refractive power, wherein a back focal length is longer than a focal length of the entire lens and wherein the second lens group includes an aperture stop and a partial lens group having positive refractive power and the partial lens group includes a positive meniscus lens with the convex surface facing the image side and a biconvex lens with a lens surface of the partial lens group closest to the object side being spaced from the aperture stop by a distance Δd; and
  displacing rotatively the partial lens group about a point on the optical axis on the object side of the partial lens group to reduce vibration, the point being spaced from a surface of the partial lens group on the image side by a predetermined distance, wherein a focal length fLP of the partial lens system and the focal length f of the entire lens at infinite objective distance satisfy 0.3<fLP/f<5.0, and the point being spaced from the aperture stop by a distance ΔD such that |ΔD|/Δd<0.5.

10. The method of claim 9, wherein the focal length fLP of the partial lens system and the focal length f of the entire lens at infinite objective distance further satisfy 0.5<fLP/f<2.0.

11. The method of claim 9, wherein the first lens group includes a negative meniscus lens with the convex surface facing the object side and further comprising placing the partial lens group closest to the image side in the second lens group, wherein a magnitude of a maximum angle of rotation ΔWL in radian of the partial lens group during reduction of vibration satisfies ΔWL<0.1.

12. The method of claim 9, wherein a focal length f1 of a negative meniscus lens in the first lens group closest to the object side with the convex surface facing the object side, the focal length fF of the first lens group, the focal length of the entire lens f at the infinite objective distance, and longitudinal thickness L of the partial lens group satisfy 0.2<fl/fF<4.0 and L/f<0.7.

13. The method of claim 9, wherein a focal length f1 of a negative meniscus lens in the first lens group closest to the object side with the convex surface facing the object side, the focal length fF of the first lens group, the focal length of the entire lens f at the infinite objective distance, and longitudinal thickness L of the partial lens group satisfy 0.4<f1/fF<2.0 and L/f<0.35.

14. The method of claim 9, wherein a refractive index N of a negative meniscus lens in the first lens group closest to the object side with the convex surface facing the object side, and the Abbe number nyu+ of the biconvex lens in the second lens group closest to the image side satisfy 1.5<N− and 40<nyu+ respectively.

15. The method of claim 9, wherein a radius of curvature R1 of a surface closest to the object side of the positive meniscus lens which is closest to the object side in the partial lens group, a radius of curvature R2 of a surface closest to the image side of the positive meniscus lens which is closest to the object side in the partial lens group, a predetermined distance D between a surface closest to the image side in the partial lens group and the point along the axis, and the focal length fLP of the partial lens group satisfy −3.0<(R2+R1)/(R2−R1)<0 and 0<D/fLP<10.0.

16. The method of claim 9, further comprising placing a fixed flare stop on the optical axis to shield undesirable light rays when the partial lens group rotates around the point to reduce vibration.

17. A wide-angle lens with an image stabilizing function, including, from a front, object side to a rear, image side of the lens, a first lens group with negative refractive power, a second lens group with positive refractive power, wherein a back focal length is longer than a focal length of the entire lens, the second lens group including an aperture stop and a partial lens group having positive refractive power and including a positive meniscus lens with the convex surface facing the image side and a biconvex lens, and a lens surface of the partial lens group closest to the object side being spaced from the aperture stop by a distance Δd, the wide-angle lens comprising:
  means for displacing the partial lens group for reducing vibration by causing rotational motion of the partial lens group about a point on the optical axis on the object side of the partial lens group, the point being spaced from a surface of the partial lens group on the image side by a predetermined distance, wherein a focal length fLP of the partial lens system and the focal length f of the entire lens at infinite objective distance satisfy 0.3<fLP/f<5.0, and the point being spaced from the aperture stop by a distance ΔD such that |ΔD|/AΔ<0.5.

18. A wide-angle lens with an image stabilizing function, comprising, from a front, object side to a rear, image side of the lens:
  a first lens group with negative refractive power;
  a second lens group with positive refractive power, wherein a back focal length is longer than a focal length of the entire lens, the second lens group comprising an aperture stop and a partial lens group having positive refractive power, with a lens surface of the partial lens group closest to the object side being spaced from the aperture stop by a distance Δd; and a displacement mechanism for reducing vibration by causing rotational motion of the partial lens group about a point on the optical axis on the object side of the partial lens group, the point being spaced from a surface of the partial lens group on the image side by a predetermined distance, and the point being spaced from the aperture stop by a distance $\Delta D$ such that $|\Delta D|/\Delta d<0.5$.

19. The lens of claim 18, wherein the partial lens group comprises a positive meniscus lens with the convex surface facing the image side and a biconvex lens.

20. The lens of claim 18, wherein the focal length fLP of the partial lens system and the focal length f of the entire lens at infinite objective distance satisfy $0.3<fLP/f<5.0$.

21. The lens of claim 18, wherein the partial lens group is located closest to the image side in the second lens group and a magnitude of a maximum angle of rotation $\Delta WL$ in radian of the partial lens group during reduction of vibration satisfies $\Delta WL<0.1$.

* * * * *